2,956,858

METHOD OF SEPARATING RARE EARTHS BY ION EXCHANGE

Frank H. Spedding and Jack E. Powell, Ames, Iowa, assignors to the United States of America as represented by the United States Atomic Energy Commission No Drawing. Filed Mar. 13, 1958, Ser. No. 721,323

4 Claims. (Cl. 23—22)

This invention deals with a process of separating rare earth metal values, and in particular of rare earth metal values adsorbed on an ion exchange resin.

The rare earth metals with which this invention is concerned are those of the lanthanum group, which are the elements having atomic numbers from 57 to 71, inclusive, and also yttrium, which occurs frequently in association with the rare earth metals and has a similar chemical behavior as the rare earths. Therefore, whenever the term rare earths is used in this specification, yttrium is to be included unless otherwise indicated.

The rare earth metals occur in ores, for instance, in oxidic ores, such as xenotime or gadolinite, and also in neutron-irradiated uranium as the so-called fission products. They are difficult to separate on account of their similar chemical properties.

The ores containing the rare earth metals are usually opened with a mineral acid, and the reaction mass obtained thereby is then leached with water. The solutions thus resulting are then treated for separation and isolation of the individual rare earths.

One of several methods used heretofore for this purpose comprises the adsorption of the rare earth metal values on a cation exchange resin and subsequent fractional elution, for instance, with the ammonium salt of ethylenediaminetetraacetic acid, hereafter referred to as the ammonium salt of EDTA. This process just mentioned forms the subject matter of U.S. Patent 2,798,789, granted to Spedding et al. on July 9, 1957.

While the process of U.S. Patent 2,798,789 is highly satisfactory for the separation of the lighter rare earth metals and their resolution into fractions containing the individual rare earths, it has been found not quite so efficient for the separation of the heavier rare earths. For instance, lutetium and ytterbium are not resolved very cleanly by the elution with the ammonium salt of EDTA. Furthermore, EDTA has the disadvantage that it requires the cation exchange resin to be in the cupric form, because free ethylenediaminetetraacetic acid is water-insoluble, and therefore if the resin is used in the hydrogen form, free ethylenediaminetetraacetic acid precipitates in the interstices of the resin. The necessity of regenerating the used resin with cupric ions rather than cheap hydrogen ions from a source like sulfuric acid adds to the cost of the entire process. When the copper form of the resin is used, the chelating agent ends up in a stable copper chelate compound from which it is difficult and expensive to recover both the copper and the chelating agent in reusable form. If hydrogen ion could be used in place of copper, the eluant used to develop the mixture of adsorbed ions would be recovered in a form which can be reused after a simple neutralization procedure.

Another drawback of EDTA is that it does not bring about satisfactory separation and decontamination of the rare earths from lead, cobalt, zinc, thorium and uranium values, which often are present in the solutions to be treated. This is so because the heavy-rare-earth chelate compounds have a very high stability which, in turn, requires a slow flow rate for satisfactory ion exchange. Therefore it was found advantageous to use a less avid chelating agent in order to increase the rate of exchange and to settle for a less good separation factor. The increased rate of exchange at a given flow rate overcomes the poorer separation factor obtained with less avid chelating agents than EDTA and may permit sharper resolution of the adjacent developed rare earth bands.

It is an object of this invention to provide a process for the separation of rare earth values in which the above enumerated drawbacks are overcome.

It is thus an object of this invention to provide a process for the separation of rare earth metal values by ion exchange in which the cation exchange resin can be used in the hydrogen form.

It is also an object of this invention to provide a process for the separation of rare earth metal values from a mixture thereof in which regeneration of the used resin can be accomplished in a simple and inexpensive manner.

It is also an object of this invention to allow inexpensive recovery of the chelating agent for reuse in the separation process.

It is furthermore an object of this invention to provide a process for the fractional elution of rare earth metal values from cation exchange resins in which the eluant can be passed through the resin at comparatively high flow rates.

It is finally also an object of this invention to provide a process for the fractionation of rare earth metal values by which a separation of the rare earths from contaminants, such as lead, zinc, cobalt, thorium and uranium is accomplished.

It was found that N-hydroxyethylethylenediaminetriacetic acid is a suitable chelating agent for the elution of rare earths, in particular the heavier rare earths, from cation exchange resins. The N-hydroxyethylethylenediaminetriacetic acid, hereinafter abbreviated as HEDTA, is preferably used in the form of its ammonium salt. HEDTA has the great advantage over EDTA that it is water-soluble so that the resin does not have to be in the copper form but can be used in the hydrogen form. Since HEDTA is recovered as the soluble free acid rather than as a stable copper chelate compound, it can be regenerated by neutralization with ammonium hydroxide and recycled in the process, as will be described later.

It was found that HEDTA is highly efficient for isolating elements 57 through 60, is less suitable for separating elements 61 through 67, and is extremely effective, in fact much more so than EDTA, in obtaining sharp resolution for elements 68 through 71. So far as is known, HEDTA is the only reagent that will cleanly separate Yb and Lu.

The process of this invention thus comprises passing an aqueous solution containing a mixture of rare earth metal values through a cation exchange resin, then flowing an aqueous solution of HEDTA through the cation exchange resin whereby the rare earths are desorbed and readsorbed, however, at different rates, the heavier rare earth metal values being desorbed at a faster rate than the lighter ones because of stronger complex formation of the heavier rare earths with the HEDTA, so that a separation of the individual rare earths takes place gradually as a result of repeated desorption and re-adsorption and consecutive layers or "bands" of the individual rare earths develop. The eluates are then collected fractionally whereby solutions greatly enriched in individual rare earths are obtained.

Any cation exchange resin is suitable for the process of this invention. For instance, sulfonated resinous condensates of phenol and formaldehyde and nuclear sulfonic acid aromatic-type resins have given satisfactory results.

Also, the carboxylic acid-type cation exchange resins are suitable, provided the operational pH is not too low. While the particle size of the resin was not critical, a mesh size of between 25 and 100 was preferred. Although finer resin particles would provide sharper resolution of bands, this advantage is largely nullified in long resin bed systems by the excessive pressure drop along the bed. The resin is preferably used in the hydrogen form.

The solution containing the rare earth mixture, the "feed solution," can be used in acid, neutral or alkaline form up to a pH of about 9. The pH value, however, preferably ranges between 1 and 7.

The HEDTA is preferably used as the ammonium salt. The concentration of the solution can vary widely; a concentration of between 0.01 and 0.05 M is preferred unless the mixture being treated contains only elements of atomic number less than 65. The concentration allowable depends on the solubility of the chelate compounds of the species being eluted. The light rare earth chelates are much more soluble than the heavy rare earth chelates. The ammonium salt is obtained by neutralizing an aqueous solution of free HEDTA with ammonia which can be done until one, two or all three of the carboxy-hydrogens have been metathesized, but preferably to a composition corresponding to a formula between $(NH_4)_2HCh$ and $(NH_4)_3Ch$.

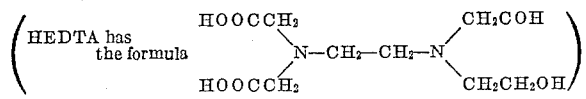

As has just been done above, the HEDTA will also be expressed sometimes in this specification by the symbol $H_3Ch$ in which the Ch stands, so to speak, for the chelate anion while the $H_3$ symbolizes the three reactive ionizable hydrogen atoms of the carboxy groups. The ammonium salts are then expressed by the symbols $(NH_4)H_2Ch$, $(NH_4)_2HCh$ and $(NH_4)_3Ch$, depending on the degree of neutralization of HEDTA or $H_3Ch$ with ammonia. In a strongly acid solution these compounds associated with protons and thereby form a cationic radical corresponding, for instance, to the formula $H_5Ch^{++}$.

The process, as all ion-exchange processes, can be carried out in a discontinuous batch operation or—and this is the preferred, because more efficient, way—in a continuous manner. For the latter embodiment adsorption columns containing the resin are used, the height and number of which is dependent upon the degree of separation desired and the composition of the feed solution.

In treating a resin column on which rare earth values have been adsorbed (by flowing a feed solution containing a rare earth mixture therethrough) and passing a solution of an ammonium salt of the chelating agent of this invention, say $(NH_4)_2HCh$, through the resin, ion exchange takes place first between the ammonium ion of the chelating agent and rare earth ions which are adsorbed at the top of the resin bed or bed system, the ammonium ions adsorbing on the resin and the rare earth ions reacting strongly with the anions of the chelating anions to form neutral RECh species which do not adsorb on the cation exchange resin.

The stoichiometry is such that three ammonium ions are necessary to displace one trivalent rare earth ion from the resin. Since one rare earth ion reacts with one and only one chelate ion, three molecules of $(NH_4)_2HCh$ liberate only two rare earth ions and only two molecules of RECh form. The third chelate anion ends up associated with the three hydrogen ions. The composition corresponds to one molecule of $H_3Ch$ for every two molecules of RECh. However, the $H_3Ch$ is partly dissociated so that $H^+$, $H_2Ch^-$, $HCh^=$ and $Ch^{\equiv}$ are present as well. After the $H_3Ch$ has passed through the region where the rare earths are adsorbed, it associates with additional $H^+$ ions which are adsorbed on the bed and forms a cationic species $H_5Ch^{++}$ in which form it remains attached to the resin bed until some RECh comes along. Three $H_5Ch^{++}$ ions from the resin will then react with two RECh molecules leaving two trivalent rare earth ions adsorbed on the resin and three molecules of $H_3Ch$ in the solution. As before, this $H_3Ch$ will react with hydrogen ions on the resin bed to form a band of adsorbed $H_5Ch^{++}$ between the developing rare earth bands and the resin which is in the hydrogen form. At this instance, the effluent coming off the resin is pure water.

Upon further introduction of $(NH_4)_2HCh$ more rare earth ions are displaced from the top of the resin bed to form RECh and half as much $H_3Ch$ as RECh is formed in the solution phase. The $H_3Ch$ and RECh percolate through the region of the resin where a number of rare earth species are adsorbed whereupon the chelate anion exchanges unattractive rare earth partners for more attractive ones until it reaches the band of adsorbed $H_5Ch^{++}$ which is progressing down the resin bed immediately ahead of the adsorbed rare earth band. Here the RECh and $H_5Ch^{++}$ species interact in such a manner that for each three $H_5Ch^{++}$ ions dislodged two rare earth ions are deposited leaving their two $Ch^{\equiv}$ partners in solution to combine with the three $H_5Ch^{++}$ ions to form five molecules of $H_3Ch$ making a total of six molecules of $H_3Ch$ in a volume of solution which contained only three molecules of $(NH_4)_2HCh$ when it entered the column.

Where the rare earths are desorbed, ammonium resin is formed; where they are readsorbed, $H_3Ch$ is formed. Finally $H_3Ch$ leaves the column, but at a concentration about twice as high as that in the $(NH_4)_2HCh$ eluant introduced into the column. Finally the rare earths will have been washed down the column by repeated adsorption-desorption cycles, and then they start leaving the resin in the effluent wherein they are present as chelates, such as RECh.

The water that was obtained as the first effluent can be used to dilute the more concentrated $H_3Ch$ effluent and fresh ammonia can be added to regenerate it to a $(NH_4)_2HCh$ solution for reuse. In the case of $(NH_4)_3Ch$, instead of $(NH_4)_2HCh$, the concentration of the chelating agent in the effluent is about 2½ times as high as of that introduced.

The rare earths can be recovered from these effluents by various methods. For instance, the chelate complex can be isolated by evaporation of the water and the chelate complex can be decomposed by heating; or the rare earths can be precipitated by the addition of oxalic acid anions. These phases of the process are not part of the invention.

Further separation and purification of the rare earths present in the enriched fractions obtained can be accomplished, of course, by repetition of adsorption and elution using a smaller amount of resin and of complexing agent solution.

The individual effluents are treated for recovery of the rare earth values. This is preferably done by adding oxalate anions to the solutions and separating the precipitated rare earths, for instance, by filtration. The filtrate then contains any excess of oxalic acid or of water-soluble oxalate, depending on the form in which the oxalate anions were added, traces of rare earth-HEDTA compounds, HEDTA and ammonium salts thereof.

This filtrate is passed through a new resin bed in which the resin is in the hydrogen form; the oxalic acid is not retained by the resin but passes through. It can be regenerated for re-use by evaporating and thus concentrating the effluent fraction containing it. The HEDTA, HEDTA-compounds, ammonium ions and any rare earths that were not precipitated as the oxalates are adsorbed on the resin. The adsorption is performed in such a manner that the rare earths and ammonium ions stick on the first of a series of resin beds while the HEDTA largely adsorbs on subsequent beds. The rare earths on the first portion of resin are salvaged by elution with HEDTA. The HEDTA then on the remaining resin is finally recovered, too, by passing an aqueous solution of ammonia through the resin, for instance, one having a concentration of 0.5 M, whereby a solution of free HEDTA is obtained. In the case of 0.5 M ammonia, the HEDTA-solution obtained had a concentration of 0.25 M. Thus there are no losses to speak of in the process of this invention. The materials consumed consist of ammonia and sulfuric acid, a by-product of the process being ammonium sulfate solution which forms when the ammonium-form resin is regenerated to the hydrogen form with sulfuric acid. If desired, caustic soda could be added and the solution heated to evolve ammonia, which could be returned to the process, leaving a by-product of sodium sulfate.

The efficiency of the entire process can be increased still furthermore by operating while the solutions are at elevated temperature; this expedites ion exchange and makes the use of higher flow rates possible.

While this process is usable for the separation of a large percentage of the rare earths as they occur in ores and solutions obtained therefrom and from the processing of neutron-irradiated uranium, the invention has been found particularly advantageous, as compared with the elution by means of EDTA used heretofore, for the separation of the heavier rare earths having atomic numbers between 67 and 71, inclusive, from each other.

In the preferred embodiment of our invention the rare earths are first preseparated with EDTA into three fractions, a lighter fraction usually comprising elements lanthanum through terbium, a heavier fraction comprising the rare earths from dysprosium though lutetium and a center fraction containing yttrium predominantly; this preseparation with EDTA is carried out as disclosed in U.S. Patent 2,798,789, referred to above. The fraction containing the heavier earths, Ho through Lu, is then resolved by the process of this invention using HEDTA. This preferred embodiment is illustrated in the following example.

*Example*

A total of 1750 pounds of disintegrated xenotime was digested with 2800 pounds of a 93% sulfuric acid at a temperature of about 240° C. After about 17 hours the mass obtained was leached with several fractions of water, the total volume of which amounted to 4200 gallons. The various fractions of leach solution together contained the equivalent of about 1000 pounds of oxides with the following distribution: 0.6% by weight of $Lu_2O_3$, 5.7% $Yb_2O_3$, 0.8% $Tm_2O_3$, 5.7% $Er_2O_3$, 1.7% $Ho_2O_3$, 7.3% $Dy_2O_3$, 59.0% $Y_2O_3$, 0.9% $Tb_2O_3$, 2.7% $Gd_2O_3$, 0.1% $Eu_2O_3$, 1.2% $Sm_2O_3$, 2.8% $Nd_2O_3$, 0.8% $Pr_2O_3$, 4.3% $Ce_2O_3$ and 3.1% $La_2O_3$.

The first leach solutions, which contained comparatively high amounts of free sulfuric acid, were passed through beds of cation exchange resin whereupon the later, less acid leach fractions were successively passed through the same resin beds. The resin used was a sulfonated styrene-divinyl benzene copolymer which had been prepared in accordance with Example I of U.S. Patent No. 2,366,007 granted to D'Alelio on December 26, 1944; the resin had a particle size of between 40 and 50 mesh. This resin, in the ammonium, hydrogen or copper form, was the same throughout this example.

For adsorbing the complex mixture of rare earths and yttrium, four columns, "the loading columns," were used; they were connected in series. Each column was made of stainless steel, had a diameter of 30 inches and was 10 feet high. The resin bed in each column was 9 feet high. In these four loading columns the resin was in the ammonium form. When the rare earth solutions came in contact with the resin, ion exchange took place; the hydrogen of the sulfuric acid converted the resin to the hydrogen form, ammonium ion was released and the rare earth cations then exchanged with the hydrogen ion and/or any remaining ammonium ion of the resin. The rare earths were desorbed and readsorbed as the solutions flowed down the resin beds, the heavier rare earths being desorbed only slightly faster and readsorbed only slightly more slowly than the lighter ones under these conditions.

The bottom of the fourth loading column was connected with the top of the first of eight "development columns" which had the same dimensions as the loading columns. The resin in these development columns had been converted to the copper form by passing a nearly saturated aqueous solution of copper sulfate through the ammonium-form resin. The second through eighth development columns were connected in series, and the first development column could be connected with the second one, as will be described later.

Beside the development columns, there were arranged three "auxiliary columns" each of which also was 30 inches in diameter but which were only 3½ feet high. They, too, contained the resin in the copper form. The first of the development columns could be connected either with the first of the three auxiliary columns, or with the second development column.

After all the leach solution fractions had been passed onto the resin, the loading zone columns were saturated with rare earths; elution for preseparation was then started by introducing into the first loading column, and thence through the following columns, a 0.0153 M aqueous solution of ammonium ethylenediaminetetraacetate (EDTA) at a flow rate of 10 liters per minute; the solution had a pH value of 8.4.

In the beginning of the operation, as long as the heavy rare earths were progressing down and passing off the first development column, the latter was connected with the first auxiliary column so that elution proceeded from the first through the three following loading columns, thence through the first development column and after this through the first auxiliary column. After, from the location of the colored erbium and holmium bands, it was noted that the heavier rare earths had been washed on the first auxiliary column, the first development column was disconnected from the auxiliary column and connected with the second development column.

After about six days of elution with EDTA, analyses taken of the effluents from the various columns showed that all of the lutetium, ytterbium, thulium and erbium and about half of the holmium had been adsorbed in the first auxiliary column; it was furthermore found that a holmium-dysprosium mixture and a dysprosium-yttrium mixture was present at and near the bottom of the first development column. These mixtures, all of the yttrium and the rare earths lighter than dysprosium, were washed, also with EDTA solution, through development columns 2–8, and, while passing therethrough, by repeated adsorption-desorption cycles, they were separated into individual enriched bands. These enriched bands of rare earths which separated from the yttrium were adsorbed on the other auxiliary columns during the yittrium recovery process.

The heavy rare earths, which were diverted on the first auxiliary column, were then separated by the process of this invention (the phases of the process of this example described thus far are merely preparatory steps and not part of the invention).

In the auxiliary column the lutetium and ytterbium had not yet been resolved very cleanly, and the heavy rare earths also were contaminated with lead, cobalt, zinc and thorium. The rare earths were now eluted with an aqueous solution of HEDTA, according to this invention, from the auxiliary columns and washed into the first of 25 "separation columns" connected in series with each other. Each of the separation columns had a diameter of 6 inches and contained a 4-foot high resin bed.

The cation exchange resin in the first column was in the copper form, while the resin in the other 24 columns was in the hydrogen form. The copper-form resin was necessary in the first column to allow any EDTA that was still coming off the previous auxiliary column to be present in a water-soluble form so that the pores of the resin were not clogged by a water-insoluble EDTA-compound. The considerable decrease of column diameter in comparison to the previously used columns resulted in bands of greater length, in comparatively less total overlap of the developed bands and consequently in better separation.

The elution, according to this invention, was carried out with a 0.018 M solution of HEDTA that had been neutralized with ammonia to a pH value of 7.5. The HEDTA solution thus neutralized corresponded approximately to the formula $(NH_4)_2HCh$. The flow rate of the eluant was 500 ml./min. The eluant was passed consecutively through all 25 columns, that is, the effluent coming off one column at the bottom was fed to the top of the next following column. Any copper-EDTA compound formed in the first separation column passed through all subsequent separation columns containing the resin in the hydrogen form without cleavage or formation of a water- or acid-insoluble compound. After all EDTA retained from previous phases of the process had been flushed out, any excess copper not reacted with EDTA and then the rare earths were washed down the columns.

When the front edge of the band, that is, the edge closest to the discharge end of the system, approached the 20th column, the flow rate of the HEDTA was reduced to 200 ml./min., and when it approached the bottom of the 25th column, elution was suspended and samples were taken from the tubes connecting the separation columns and analyzed. It was found that the system had then reached a steady state and that eight of the 25 columns contained ytterbium as the only rare earth and that seven columns contained erbium only. These eight columns on the one hand and the seven columns on the other hand were stripped with EDTA. To either solution thus obtained, oxalic acid was added whereby precipitates formed; these precipitates were filtered off and ignited. The two products were analyzed and found to contain 24,834 grams of $Yb_2O_3$ and 20,716 grams of $Er_2O_3$, respectively, both of higher than 99.9% purity.

The minor quantities present of thulium and lutetium in the two overlapping sections containing Pb-Lu-Yb and Yb-Tm-Er mixtures, respectively, were then eluted, also with the same neutralized HEDTA solution, onto five beds which were four inches in diameter and four feet high, using a flow rate of 50 ml./min.; thence elution was continued onto two more beds of the same dimensions, but using a flow rate of 25 ml./min. By this procedure an additional 1082 grams of $Yb_2O_3$ and 2630 grams of $Er_2O_3$, both again of above 99.9% purity, were obtained. Also, 3733 grams of $Tm_2O_3$ and 2769 grams of $Lu_2O_3$ of a purity greater than 99.9% were isolated.

The rare earths separated by the process of this invention have a great many utilities most of which are known to those skilled in the art. Erbium oxide, for instance, is used in the glass industry for making colored glass. Thulium, and in particular the isotope 170, is being used for portable X-ray units as described in U.S. Patent No. 2,798,164, granted to Samuel Untermyer on July 2, 1957. The stable isotope of dysprosium, Dy-164, can advantageously be used in neutronic reactors as control material, because it has a high neutron-capture cross section (2700 barns) and because, when bombarded with neutrons, it forms istope Dy-165 which has a still higher cross section (4700 barns). Lutetium is diamagnetic and is useful as a diluent for gadolinium in low temperature magnetic experiments. Ytterbium is a malleable rare earth metal and can be made into thin foils for use as a getter.

It will be understood that this invention is not to be limited to the details given herein but that it may be modified within the scope of the appended claims.

What is claimed is:

1. A process of separating various rare earth metal values having atomic numbers of from 57 through 60, from 68 through 71 and including yttrium values from each other, comprising passing an aqueous feed solution containing a mixture of said rare earth metal values through a cation exchange resin in the hydrogen form whereby said rare earth metal values are adsorbed on said resin; flowing an aqueous solution of N-hydroxyethylethylenediaminetriacetic acid anions as an eluant through said resin whereby the rare earth metal values are chelated and desorbed from the resin in the order of decreasing atomic number, yttrium behaving as an element of an atomic number of between 60 and 62 in that it falls between Nd and Sm, whereby an effluent is obtained; collecting said effluent in fractions; passing an aqueous ammonia solution over said resin whereby free N-hydroxyethylethylenediaminetriacetic acid is recovered for reuse and the resin is converted to the ammonium form; passing sulfuric acid over the resin whereby it is converted to the hydrogen form and made ready for reuse; adding oxalic acid to the effluent whereby rare earth metal values precipitate; separating the precipitated rare earths from the supernatant effluent; contacting the supernatant effluent with additional cation exchange resins whereby any non-precipitated rare earth metal values and N-hydroxyethylethylenediaminetriacetic acid anions are adsorbed while the oxalic acid anions pass through the additional cation exchange resins and leave it in the effluent; contacting the additional cation exchange resin with an aqueous solution of N-hydroxyethylethylenediaminetriacetic acid anions whereby said rare earths are desorbed and washed off said additional cation exchange resin; contacting the additional cation exchange resin with an aqueous solution of ammonia whereby the N-hydroxyethylethylenediaminetriacetic acid anions are removed and recovered from the resin; and regenerating the resin to its hydrogen form by passing sulfuric acid over it.

2. The process of claim 1 wherein the aqueous feed solution has a pH of 1.0 to about 9.0.

3. The process of claim 1 wherein the eluant solution has been neutralized to a pH value of about 7.5.

4. The process of claim 1 wherein the aqueous ammonia solution for the recovery of the N-hydroxyethylethylenediaminetriacetic acid has a concentration of about 0.5 M.

References Cited in the file of this patent

UNITED STATES PATENTS

| | | |
|---|---|---|
| 2,539,282 | Spedding et al. | Jan. 23, 1951 |
| 2,798,789 | Spedding et al. | Feb. 9, 1957 |

OTHER REFERENCES

Wheelwright et al.: Atomic Energy Commission Document 1SC-637, June 1955, 85 pages; pages 75 to 77 especially of interest.